(12) United States Patent
Sjoo

(10) Patent No.: US 9,475,143 B2
(45) Date of Patent: Oct. 25, 2016

(54) GEAR HOBBING TOOL AS WELL AS AN INSERT HOLDER, A CHIP REMOVAL UNIT, AND AN INSERT KIT THEREFOR

(71) Applicant: SANDVIK INTELLECTUAL PROPERTY AB, Sandviken (SE)

(72) Inventor: Sture Sjoo, Gavle (SE)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 229 days.

(21) Appl. No.: 14/536,759

(22) Filed: Nov. 10, 2014

(65) Prior Publication Data

US 2015/0132075 A1   May 14, 2015

(30) Foreign Application Priority Data

Nov. 11, 2013  (EP) .................................... 13192362

(51) Int. Cl.
*B23F 21/12*  (2006.01)
*B23F 21/22*  (2006.01)
(Continued)

(52) U.S. Cl.
CPC ........... *B23F 21/223* (2013.01); *B23F 21/226* (2013.01); *B23F 21/236* (2013.01); *B23C 5/006* (2013.01); *B23C 5/22* (2013.01); *Y10T 407/1705* (2015.01); *Y10T 407/1715* (2015.01);
(Continued)

(58) Field of Classification Search
CPC ........... B23C 5/22; B23C 5/24; B23C 5/006; B23F 21/12; B23F 21/22; B23F 21/226; B23F 21/126; B23F 21/128; B23F 21/223; B23F 9/10; Y10T 407/1705; Y10T 407/171; Y10T 407/1715; Y10T 407/1725; Y10T 407/173; Y10T 407/1735; Y10T 407/174; Y10T 407/1745; Y10T 407/1912; Y10T 407/192; Y10T 407/1922; Y10T 407/1928; Y10T 407/1934; Y10T 407/1938; Y10T 407/1942; Y10T 409/10159; Y10T 409/104134; Y10T 409/104293; Y10T 409/104452; Y10T 409/104611; Y10T 409/105247

See application file for complete search history.

(56) References Cited

U.S. PATENT DOCUMENTS 3,571,876 A * 3/1971 Blakesley ............. B23F 21/226
                                                        407/22
4,575,285 A * 3/1986 Blakesley ............. B23F 21/226
                                                        407/115
(Continued)

FOREIGN PATENT DOCUMENTS

DE     2600187 A1 *  9/1976  ............ B23F 21/226
DE     2548482 A1 *  5/1977  ............ B23F 21/226
(Continued)

*Primary Examiner* — Daniel Howell
*Assistant Examiner* — Nicole N Ramos
(74) *Attorney, Agent, or Firm* — Corinne R. Gorski

(57) ABSTRACT

A tool for cyclo-palloid gear hobbing includes a head and a plurality of milling inserts protruding from a front side thereof. The milling inserts are mounted, two by two, in chip removal units that are detachably connected to the head. Each milling insert is clamped by a wedge and a screw that are easy to access. The wedge acts tangentially against the milling insert behind which there is a tangential support in the form of a shoulder. By clamping the milling insert with a respective wedge the milling inserts can be mounted and dismounted in a simple way, and each group of wedge+milling insert+tangential support can be located tangentially and thereby efficiently carry the cutting forces acting on the milling insert. In further aspects, an insert holder intended for the tool, a chip removal unit of an insert holder and an insert kit are disclosed.

18 Claims, 14 Drawing Sheets

(51) Int. Cl.
*B23F 21/23* (2006.01)
*B23C 5/22* (2006.01)
*B23C 5/00* (2006.01)

(52) U.S. Cl.
CPC ..... *Y10T407/2206* (2015.01); *Y10T 407/2268* (2015.01); *Y10T 409/105247* (2015.01)

(56) References Cited

U.S. PATENT DOCUMENTS

| | | | |
|---|---|---|---|
| 7,402,010 B2 * | 7/2008 | Bauer | B23C 5/2427 407/37 |
| 7,736,099 B2 | 6/2010 | Cole | |
| 2003/0044246 A1 * | 3/2003 | Erickson | B23F 21/226 407/21 |
| 2007/0140798 A1 * | 6/2007 | Cole | B23C 5/2221 407/21 |
| 2009/0097934 A1 | 4/2009 | Hsiao et al. | |
| 2010/0196107 A1 * | 8/2010 | Ribbeck | B23C 3/28 407/22 |
| 2011/0164931 A1 | 7/2011 | Ono | |
| 2012/0257935 A1 * | 10/2012 | Sture | B23F 21/166 407/51 |
| 2013/0294851 A1 | 11/2013 | Saagstroem | |

FOREIGN PATENT DOCUMENTS

| | | | |
|---|---|---|---|
| DE | 10349589 A1 | 12/2004 | |
| DE | 102005058536 A1 | 6/2006 | |
| EP | 2508288 A2 | 10/2012 | |
| JP | 3395266 B2 * | 4/2003 | ............ B23F 21/226 |
| JP | 2011131349 A | 7/2011 | |
| JP | 2013233646 A * | 11/2013 | |

\* cited by examiner

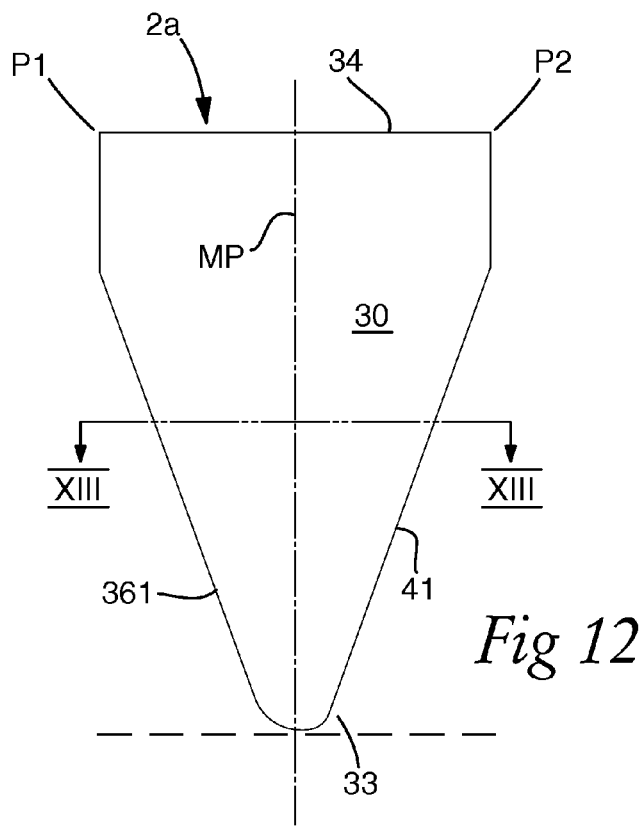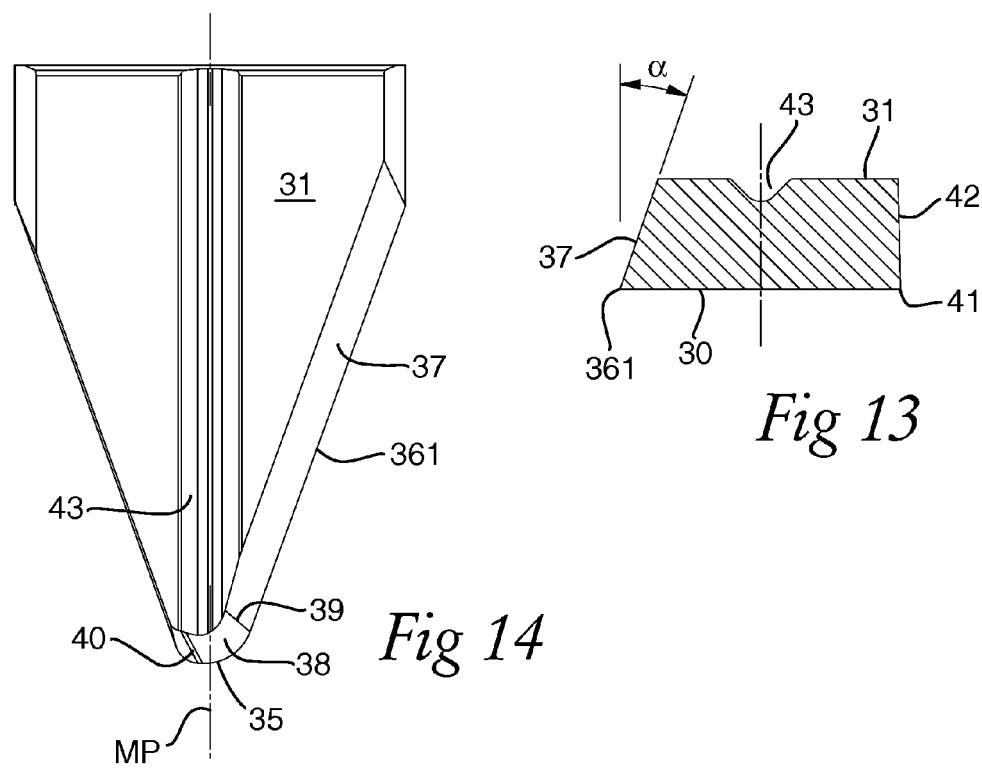
Fig 12
Fig 13
Fig 14

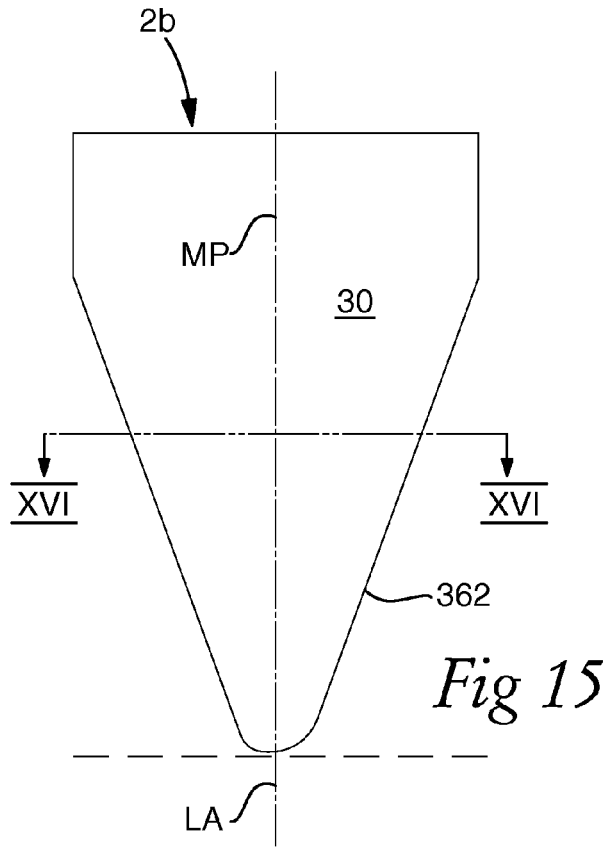
*Fig 15*
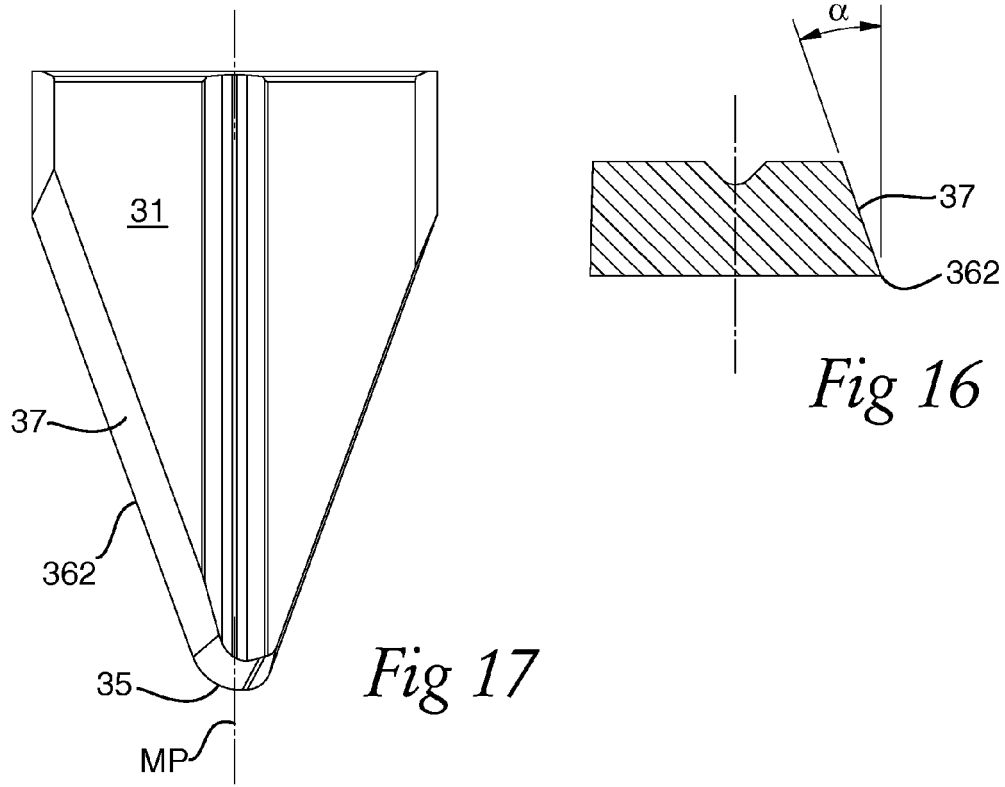
*Fig 16*
*Fig 17*

GEAR HOBBING TOOL AS WELL AS AN INSERT HOLDER, A CHIP REMOVAL UNIT, AND AN INSERT KIT THEREFOR

RELATED APPLICATION DATA

This application claims priority under 35 U.S.C. §119 to EP Patent Application No. 13192362.5, filed on Nov. 11, 2013, which the entirety thereof is incorporated herein by reference.

TECHNICAL FIELD

The present disclosure relates to a gear hobbing tool of the type that includes a head having a front side and a center axis on which the head is rotatable, and a plurality of chip removal units that are detachably mounted along the front side of the head and individually include an insert holder having an upper part and a bottom part anchored in the head, as well as a replaceable milling insert that is fixed in a seat located in the upper part of the insert holder and delimited by an axial support and a tangential support, more precisely by means of a screw, which, in addition to a male thread, includes a key grip at its one end. The disclosure also relates to an insert holder, a chip removal unit, and an insert kit for the tool.

BACKGROUND

Tools for gear hobbing are particularly suitable for forming obliquely cut teeth in conical surfaces of different workpieces, e.g. for the manufacture of crown gears, pinions, and similar details of the type that, among other things, is found in toothed gearings and trains of gears. A primary advantage of gear hobbing is that the tool and the workpiece both can be rotated in a synchronous relationship during continuous indexing of the workpiece and thereby continuous forming of the requisite tooth slots. In such a way, the machining time is reduced most considerably in comparison with older gear milling methods, in which the tooth slots were milled one by one after indexing in steps of the workpiece in relation to the tool. U.S. Pat. No. 7,736,099 discloses a gear hobbing tool, which in a front or upper side of a pulley-shaped milling cutter head includes detachably mounted chip removal units of the initially generally mentioned kind. In this case, each chip removal unit is equipped with a milling insert, which in the mounted state and protrudes above the front side of the head of the milling cutter and is fixed in the appurtenant holder by means of a screw, which extends through a through hole in the milling insert and is tightened in an upper part of the holder, more precisely in a threaded hole that mouths in a tangential support surface included in the part. This means that the screw is oriented essentially parallel to the front side of the head of the milling cutter, as well as being located in the immediate vicinity of the last-mentioned one. In such a holder, the tangential support for the milling insert is a flat surface and the axial support is two V-shaped arranged partial surfaces, which individually form an acute angle in relation to the flat tangential support surface, and which together form a wedge-shaped bottom in which a congruent, rear part of the milling insert can be accommodated, in order to, upon tightening of the screw, press the back side of the milling insert against the tangential support surface. Therefore the hole in the milling insert has to have a greater diameter than the threaded portion of the screw.

The different milling inserts are identical and co-operate in pairs in such a way that two consecutive milling inserts along a cyclo-palloid curved path machine opposite tooth flank surfaces in a tooth slot to be made. If a milling insert running ahead in the slot is right-hand cutting, i.e., machines a right flank in the tooth slot to be made, the one following behind is left-hand cutting.

It should also be mentioned that lower parts of the holders of the individual chip removal units are countersunk in hollow spaces situated below the front side of the head, and removably fixed by means of screws, which include key grips accessible from a peripheral, circumferential surface of the pulley-shaped head.

In the above-mentioned patent, it is asserted that an advantage of the disclosed tool construction would be the possibility of dismounting (and mounting, respectively) the individual milling inserts individually, without needing to dismount the appurtenant holder from the milling cutter head. This supposed advantage should, however, be of theoretical, rather than realistic, nature. Because the screws for the milling inserts are oriented parallel to and placed near the front side of the head of the milling cutter it makes the accessibility to the key grip of the screws significantly more difficult. For instance, it is impossible to use traditional T-wrenches. The possibility of releasing the milling insert running ahead of each pair of co-operating milling inserts is, therefore, considerably impaired. Even more, the possibility of individually releasing the milling inserts following behind the same pair should be practically non-existent.

Another disadvantage of the known tool is based on the dimensional accuracy of the spatial locations of the different milling inserts in relation to the geometrical fixed points, i.e., the center axis and the front side of the head, respectively, of the head of the milling cutter is of vital importance to a good machining result. Thus, in practice, there is required—within modern milling technology—a dimensional accuracy of 0.005 mm (or better). For this reason, extensive measuring and adjustment operations are required before the tool can be considered operable. Normally, the replacement of an individual milling insert does not involve any time-consuming measuring and adjustment operations, but if also the appurtenant holder would need to be dismounted and remounted, the tolerance chain between the milling insert and the fixed points of the head of the milling cutter is lost. In other words, time-consuming measuring and adjustment operations are then required, if only for just one chip removal unit.

US 2011/0164931 discloses a gear milling tool having a milling cutter head that in a front side includes a plurality of protruding cutting bodies, which are held in place by means of wedges and screws, the key grips of which are accessible from above. More precisely, the wedge holds a lower (large) part, countersunk in the head, of the individual cutting body pressed against a surrounding wall in a hollow space in which the same is mounted, the wedge acting approximately radially (inward or outward) against the bottom part of the cutting body. This means that the cutting body stability will be mediocre since the cutting forces act tangentially rather than radially against the protruding part in which the cutting edge is included. In this connection, the part of the cutting body, i.e., the one protruding and including the cutting edge, lacks any form of tangential support that could carry the cutting forces. In addition, the wedge, like the lower part of the cutting body, is countersunk in the head, and is included in a tightening mechanism that furthermore includes a plurality of additional components, which make replacement of the cutting bodies more difficult and easily may destroy the tolerance chain between the cutting edge and the milling cutter head.

SUMMARY

The present disclosure aims at obviating the above-mentioned disadvantages of the known gear hobbing tools and at providing an improved tool of this type. Therefore, a primary aspect is to provide practical options to dismount and remount any individual milling inserts without needing to dislodge the appurtenant holder from the position thereof in relation to the milling cutter head. In other words, the screw requisite for the fixation of the milling insert should have an easily accessed key grip. An additional aspect is to provide a tool in which the screw is able to fix the milling insert in a reliable way. It is also an aspect to provide a tool, the milling inserts of which are easy-cutting.

Accordingly, at least the primary aspect is attained by the seat of the individual insert holder being placed between two tangentially spaced-apart shoulders included in the upper part and protruding in the direction from the front side of the head, a first one of which includes the tangential support, and by the individual milling insert being arranged between the tangential support and a wedge having a through hole that extends between an upper side and an under side of the same and accommodates the screw, more precisely with the male thread thereof tightened in a threaded hole in the holder and with the key grip facing upward from the wedge. The wedge includes two opposite contact surfaces, which converge toward the underside thereof, and one of which is facing the milling insert and the other the second shoulder. In such a way, the screw requisite for the fixation of the milling insert becomes conveniently accessible for a key, e.g. a T-wrench, which can be brought into the key grip in the axial direction instead of the radial direction in relation to the milling cutter head.

Besides the fundamental advantage that the screw requisite for the fixation of the milling insert is generally easy to access and allows individual mounting/dismounting of the milling inserts quite regardless of the other components of the tool, the present disclosure affords the possibility of designing the tool in its entirety in a new and advantageous way. As a consequence of the fact that the two shoulders, between which the milling insert and the wedge are held fixed, are tangentially located, the cutting forces acting on the milling insert, which forces are tangentially oriented, can accordingly be carried by one of these shoulders. By giving such a force-absorbing shoulder a robust design, considerable cutting forces can therefore be carried without the milling insert running the risk of being dislodged or demolished. In addition, the milling insert can be manufactured in a compact design, which reduces the material consumption, e.g. the consumption of expensive cemented carbide, to a minimum. Also, even in comparatively small milling inserts, the absence of any weakening hole for a through fixing screw contributes significantly to good strength.

In one embodiment, the upper part of the insert holder may include three separated shoulders and two seats that are arranged between the same and individually can receive a milling insert that is kept pressed against an appurtenant tangential support by means of a wedge provided with a screw. In such a way, two milling inserts, easy to access, can be located near each other, besides which the middle shoulder can fulfil double functions, i.e., on one hand receiving a tangential support for a milling insert being in front, and on the other hand, including an abutment surface for the wedge that fixes the milling insert following behind.

In a further embodiment, the upper part of the insert holder may be wider than the bottom part thereof by including two brackets corbelling out in relation to the last-mentioned one and having undersides that can rest against the front side of the head of the milling cutter. In this way, the insert holder in its entirety obtains a rigid anchorage in the milling cutter head, because tilting of the same is efficiently counteracted.

In yet another embodiment, the milling cutter head includes two parts detachably connected to each other, e.g., on one hand a hub part having a plurality of tangentially spaced-apart and radially protruding extension arms, which individually include a radially outwardly open pocket, in which the bottom part of an insert holder is placed, and on the other hand a rim part having housings, which are tangentially spaced-apart via gaps, in which the extension arms of the hub part are situated, and which individually include a radially outwardly open pocket, in which the bottom part of a holder is placed. In this way, the insert holders can be placed near the periphery of the head of the milling cutter, and therefore the milling cutter head can be given a minimal diameter for each given application. In addition, the peripheral location of the insert holders enables a convenient mounting and dismounting, respectively, of the same.

Furthermore, the tool may include an insert kit having two different types of milling inserts, which individually include an upper side having a chip surface, an under side, and a clearance surface, which, together with the chip surface, forms a cutting edge that includes two part edges, e.g., a front nose edge and a flank edge that runs backward from the same and deviates from a center plane through the milling insert. The two types of milling inserts have an asymmetrical shape, so far that the flank edge and the nose edge of one of the types of milling inserts are located to the left of the center plane, while the flank edge and the nose edge of the other type of milling insert are placed to the right of the center plane of the milling insert. In such a way, two opposite flank surfaces along a tooth slot to be made can be machined by flank edges that, due to the wedge clamping and in spite of a compact design of the milling inserts, are freely exposed for the requisite chip removal.

In the above-mentioned embodiment, the insert kit may also include a third type of milling insert, which has a symmetrical shape so far that the same includes two flank edges that are running backward from a nose edge, deviate equiangularly from the center plane of the milling insert, and have equally great clearance angles, the nose edge of the individual symmetrical milling insert—in the mounted state of the milling insert—being situated at a greater axial distance from the front side of the head of the milling cutter than the nose edges of the asymmetrical milling inserts. In such a way, the nose edges of the symmetrical milling inserts can mill deeper into the workpiece than the nose edges of the other milling inserts. The result of this will be that the nose edges of the tooth flank-forming, asymmetrical milling inserts obtain a certain clearance against the bottom of the tooth slot. In other words, the nose edges of the asymmetrical milling inserts participate only partly in the forming of the bottom of the tooth slot, involving that the asymmetrical milling inserts become particularly easy-cutting.

In a further embodiment, the two types of asymmetrical milling inserts may be included in two different, tangentially spaced-apart, although adjacent, chip removal units. Therefore, if any of the asymmetrical milling inserts would be damaged or dislodged, the other asymmetrical milling insert is not affected.

In yet another embodiment, the individual chip removal unit may include a milling insert having an asymmetrical shape, as well as, a milling insert having a symmetrical shape. This means that the pair of milling inserts of one of the chip removal units machines one "half" of the tooth slot, while the milling inserts of the chip removal unit following behind machines the other half. Therefore, if damage or dislocation would occur along one flank surface of the tooth slot, the milling insert/inserts of the other chip removal unit is/are not affected.

In the embodiment where the tool is equipped with asymmetrical, as well as, symmetrical milling inserts, the milling inserts of each set includes four consecutive milling inserts located at differently greater radial distances from the center axis of the head of the milling cutter. In such a way, the two symmetrical milling inserts can mill out a slot bottom that is fairly wide while providing clearances against each one of the two flank surfaces that are formed by the chip removing flank edges of the asymmetrical milling inserts.

The foregoing summary, as well as the following detailed description of the embodiments, will be better understood when read in conjunction with the appended drawings. It should be understood that the embodiments depicted are not limited to the precise arrangements and instrumentalities shown.

BRIEF DESCRIPTION OF THE DRAWINGS

FIG. 12 is a front view of a first type of milling insert included in an insert kit belonging to the tool.

FIG. 13 is a cross-sectional view taken along line XIII-XIII in FIG. 12.

FIG. 14 is a view from behind of the milling insert according to FIG. 12.

FIGS. 15-17 are figures corresponding to FIGS. 12-14 showing the design of a second type of milling insert included in the insert kit.

DETAILED DESCRIPTION

Figure 1:
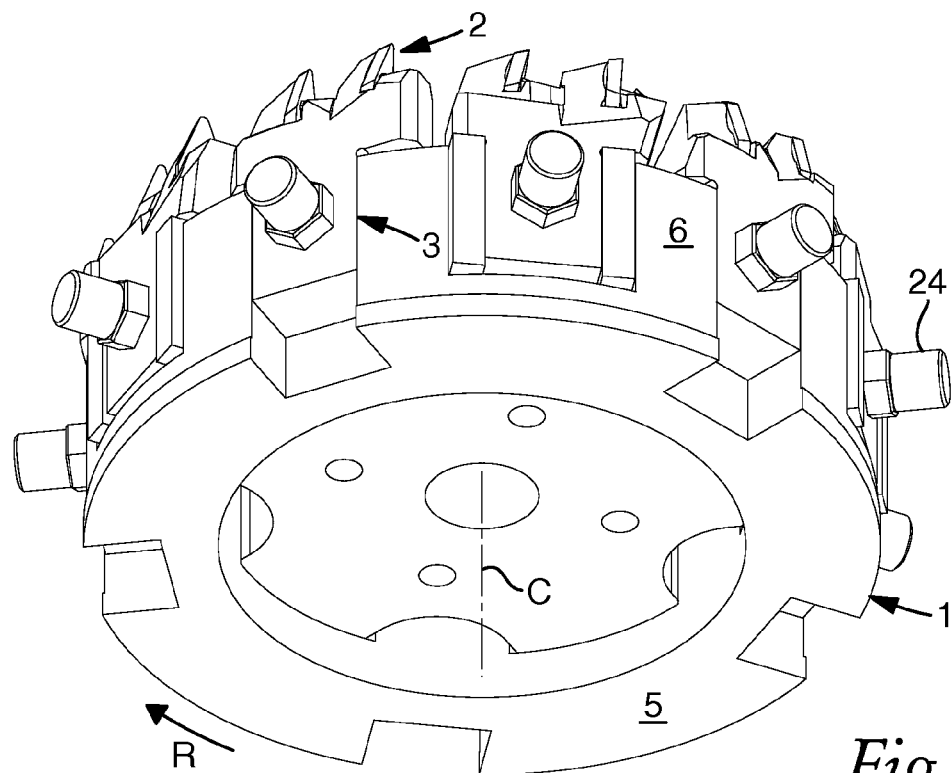
FIG. 1 is a bottom view of a complete tool according to the invention.
Figure 2:
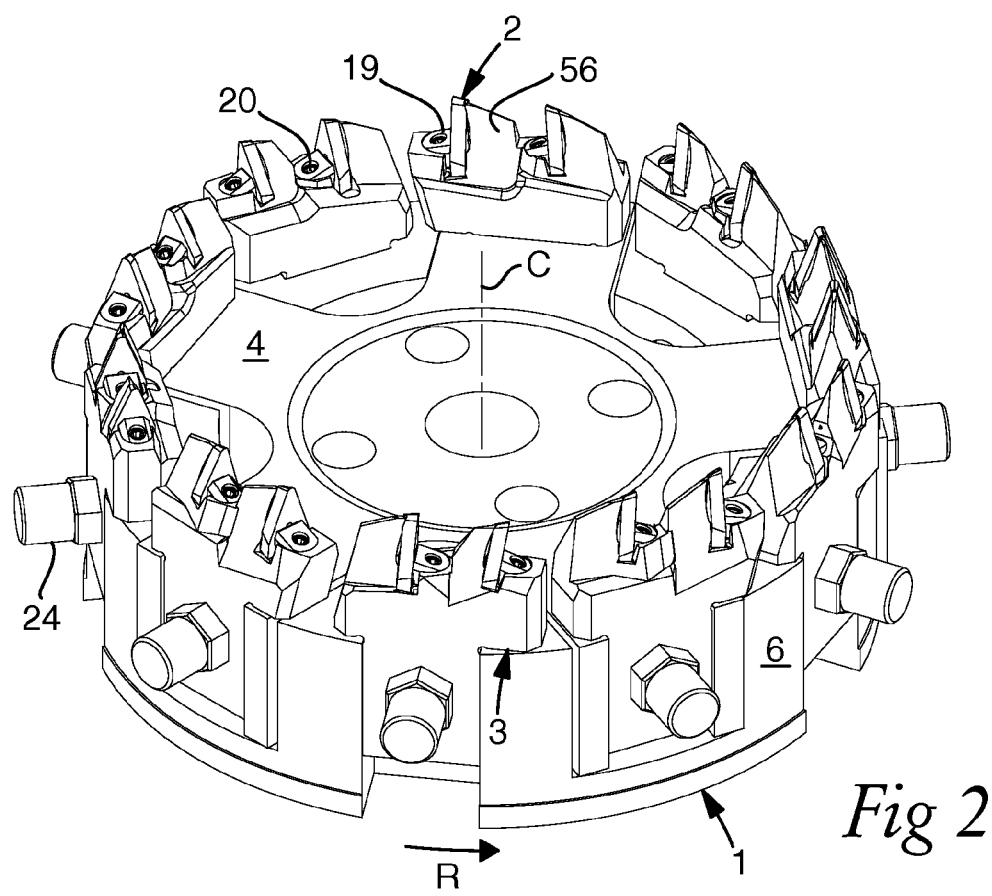
FIG. 2 is a top view of the same tool.
Figure 3:
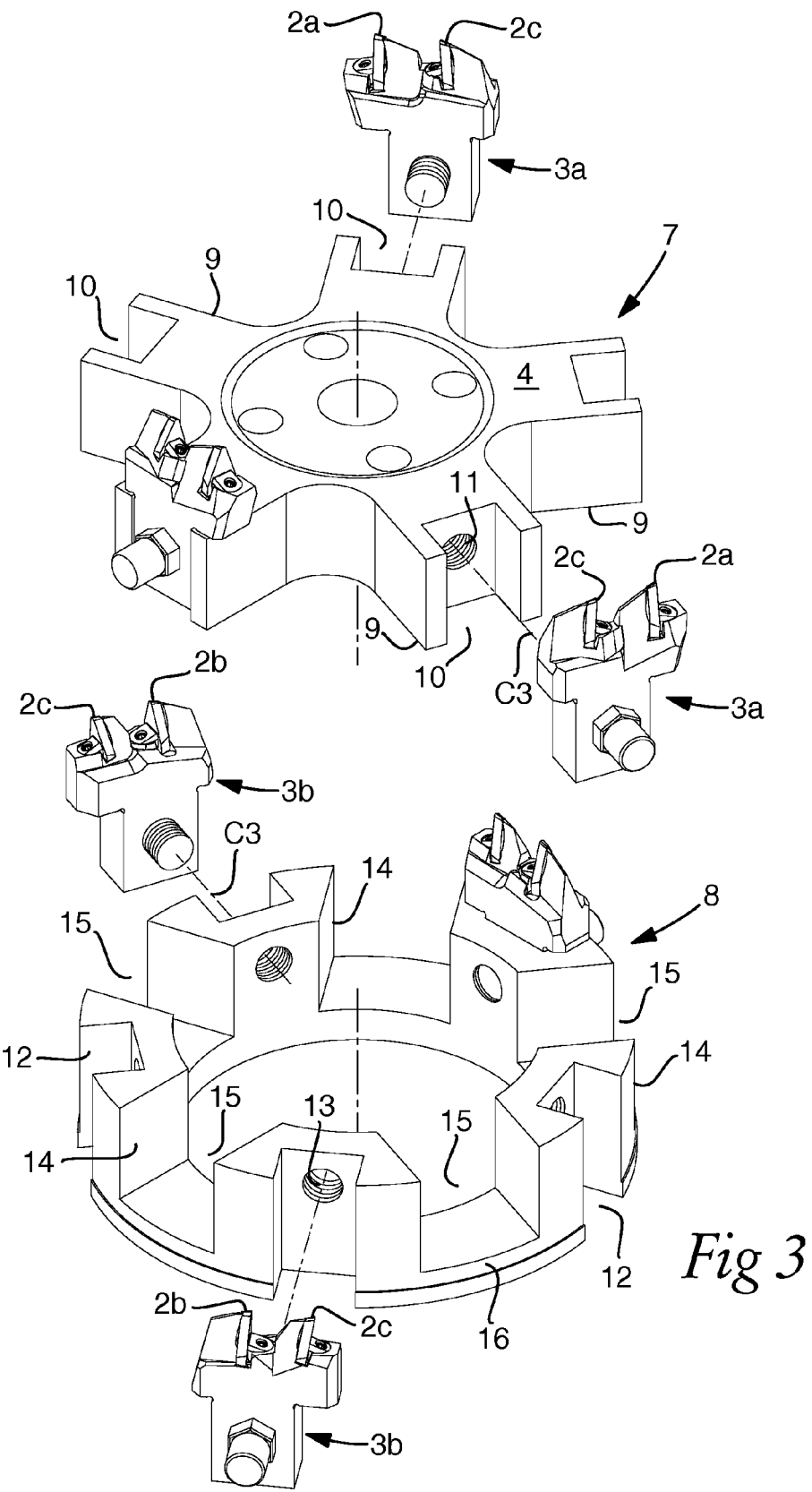
FIG. 3 is a perspective exploded view of the tool having different components exploded away from each other.
Figure 4:
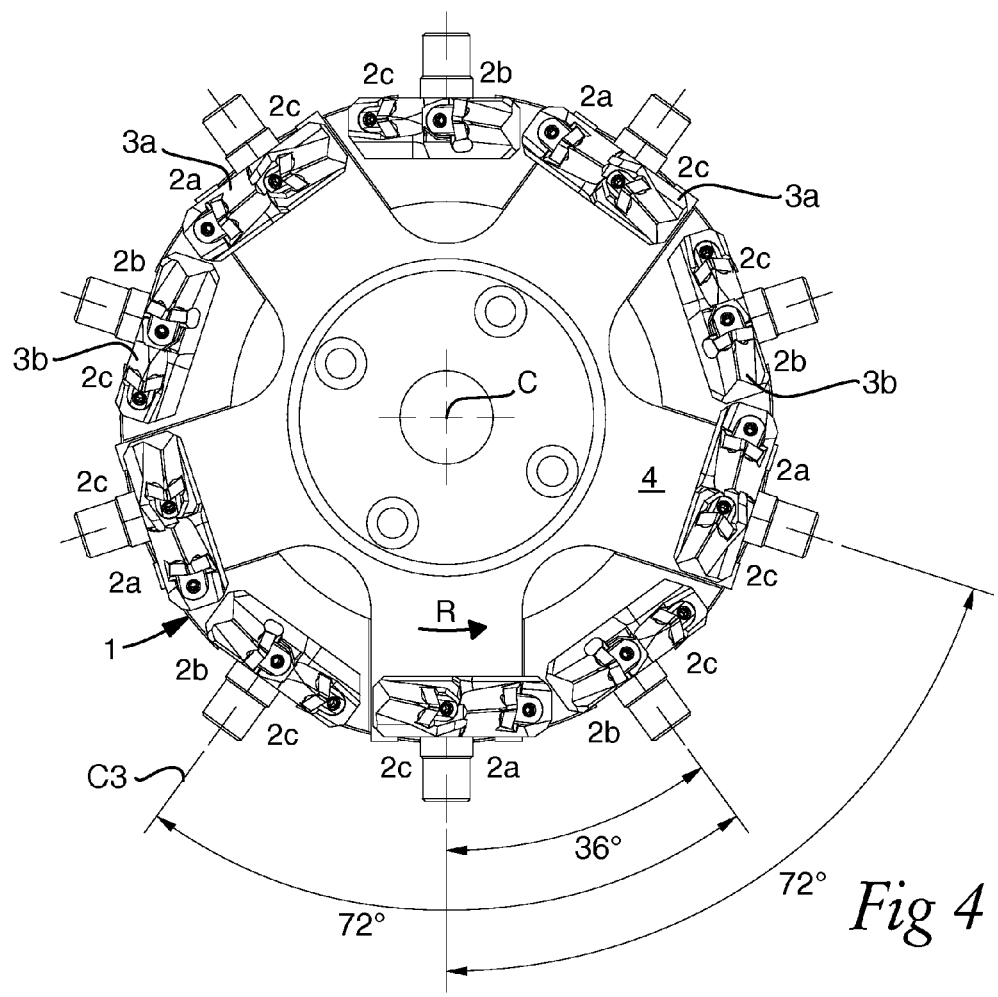
FIG. 4 is a planar view from above of the assembled, complete tool.
Figure 5:
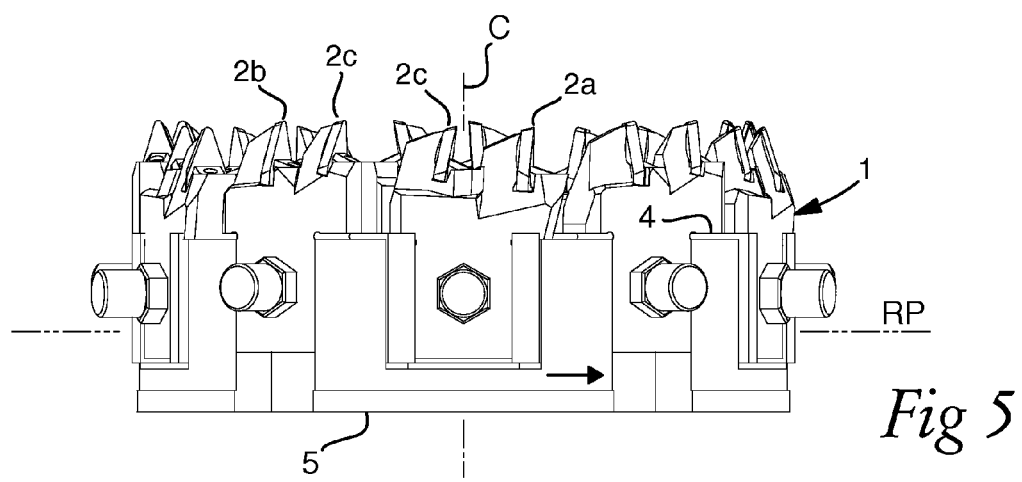
FIG. 5 is a side view of the tool according to FIG. 4.

Referring to FIGS. 1-5, the constructive structure of the tool according to the disclosure is illustrated, the basal components of which are a milling cutter head generally designated 1 (may also be denominated "basic body") and a plurality of replaceable milling inserts generally designated 2. Each such milling insert is detachably mounted in a chip removal unit generally designated 3, which in turn is detachably mounted in the head 1. The last-mentioned one is rotatable in the direction R on a center axis designated C and has a plate-like or pulley-like basic shape by, on one hand, including a pair of essentially flat front and back sides 4, 5, which are mutually parallel, and, on the other hand, a peripheral surface 6 having a cylindrical or rotationally symmetrical shape. In practice, the circumferential surface 6 is in the form of a plurality of partial surfaces, which mutually are tangent to an imaginary circle. In FIG. 5, RP designates a reference plane that extends perpendicular to the center axis C. In this case, the upper and under sides 4, 5 are generally flat and parallel to the reference plane RP.

In this connection, it should be pointed out that concepts such as "upper side" and "under side" and "upward" and "downward", respectively, only relate to the positions in which the tool is shown in the drawings. In practice, the tool may assume any spatial locations in relation to the workpiece to be machined. For this reason, the upper side is at times denominated "front side" and the underside "back side" in the subsequent text.

As seen in FIG. 3, the head 1 is composed of two parts detachably connected to each other, via a hub part 7 and a rim part 8. In the hub part 7, a plurality of (in the example five) radially protruding extension arms 9 are included, which are tangentially spaced-apart at even partitions, for example, 72°. In the outer end of each extension arm 9, a pocket 10 is formed, which is open not only in the radial direction, but also upward, as well as downward. In an inner wall in the pocket, a threaded hole 11 mouths.

Also, the rim part 8 includes pockets 12, each one of which is delimited by two side walls and an inner wall in which a threaded hole 13 mouths. These pockets 12 are formed in housings 14, which are mutually separated via gaps 15 and interconnected via bottom pieces 16. In the assembled state of the head of the milling cutter, the extension arms 9 of the hub part are received in the gaps 15 between the housings 14. In this connection, all (ten) pockets 10, 12 are open in the periphery of the head of the milling cutter, with the center axes C3 of the screw holes 11, 13 radially oriented.

Figure 6:
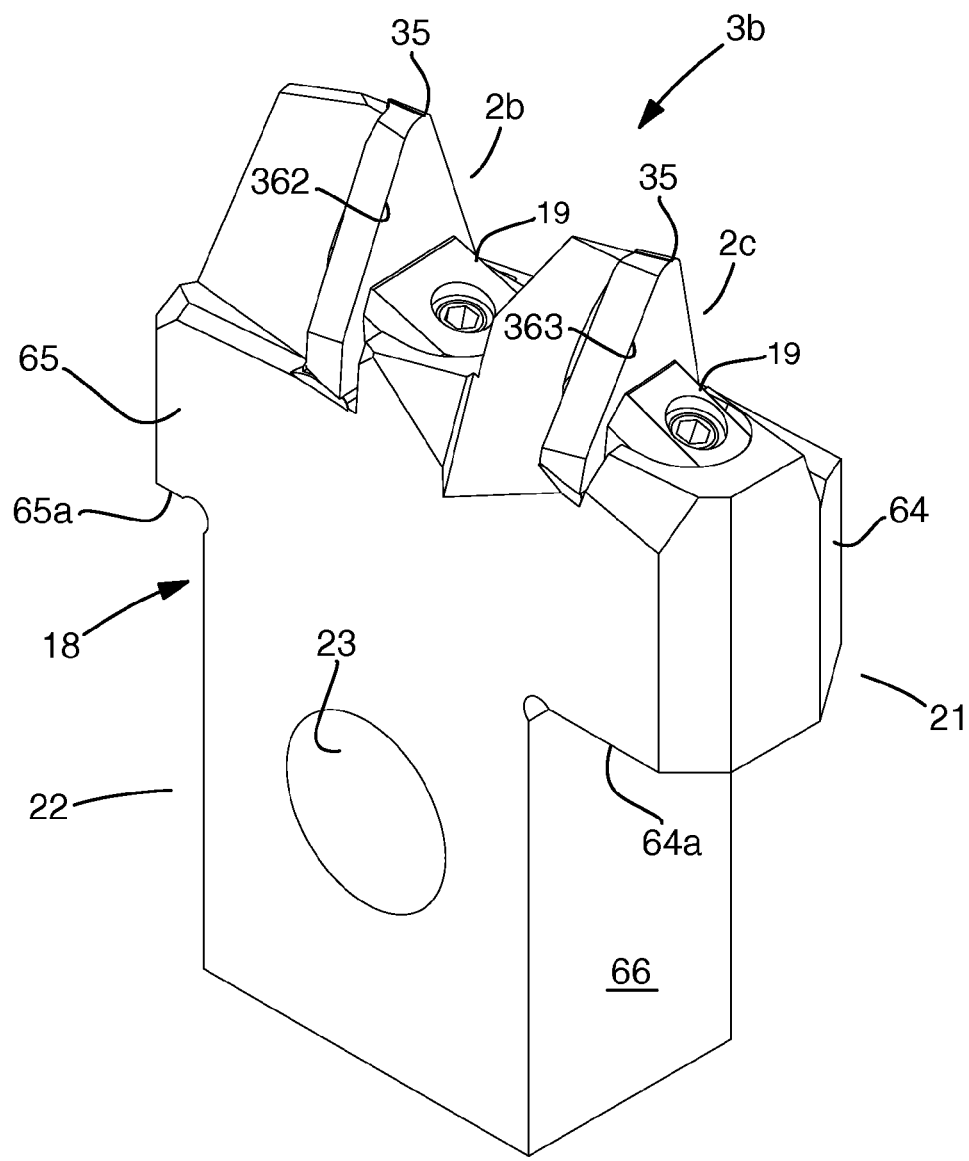
FIG. 6 is an enlarged perspective view of a chip removal unit included in the tool according to the disclosure.
Figure 7:
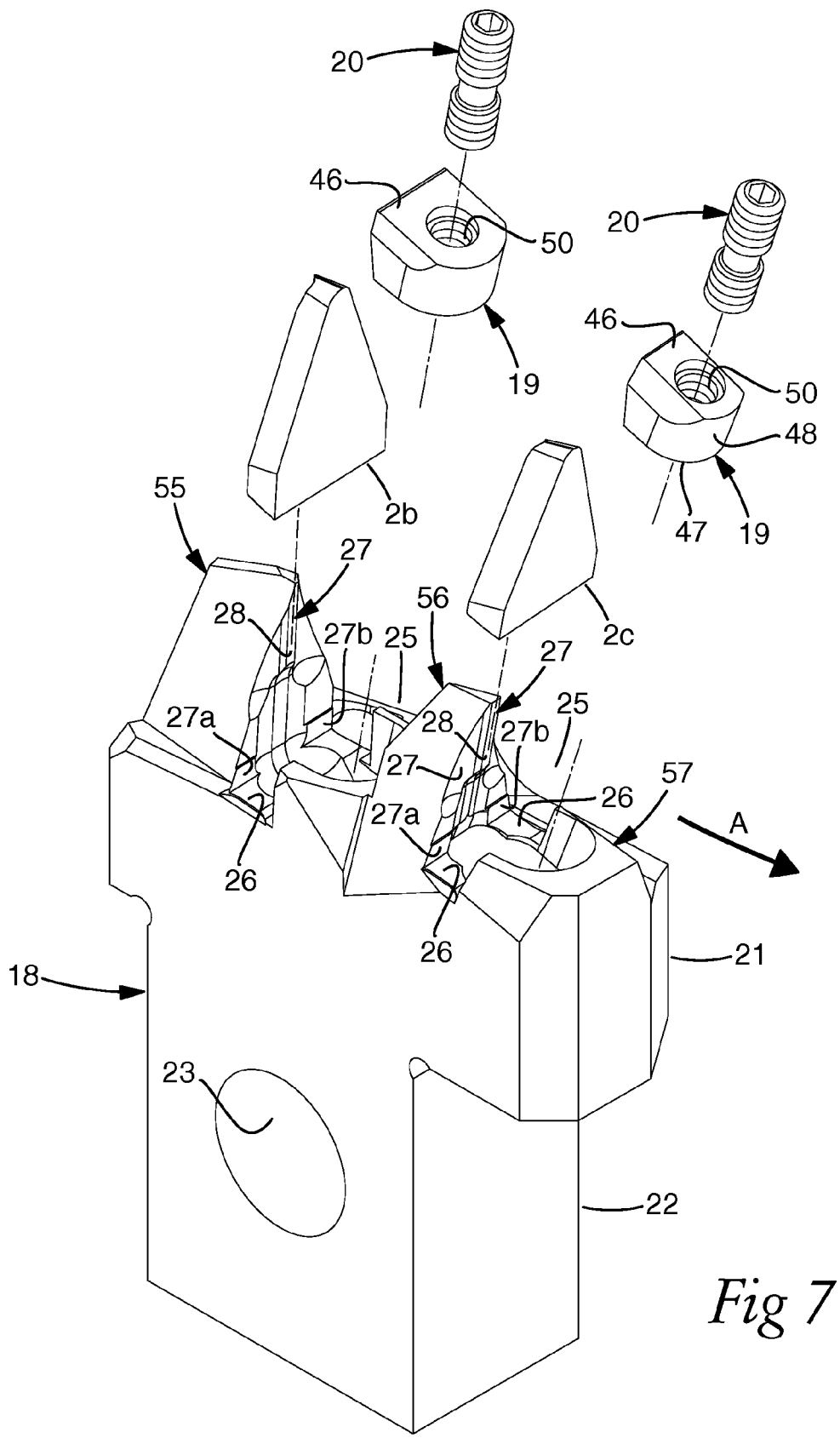
FIG. 7 is an exploded view of the chip removal unit according to FIG. 6 shown from the front in respect of the direction of motion of the unit during operation.
Figure 8:
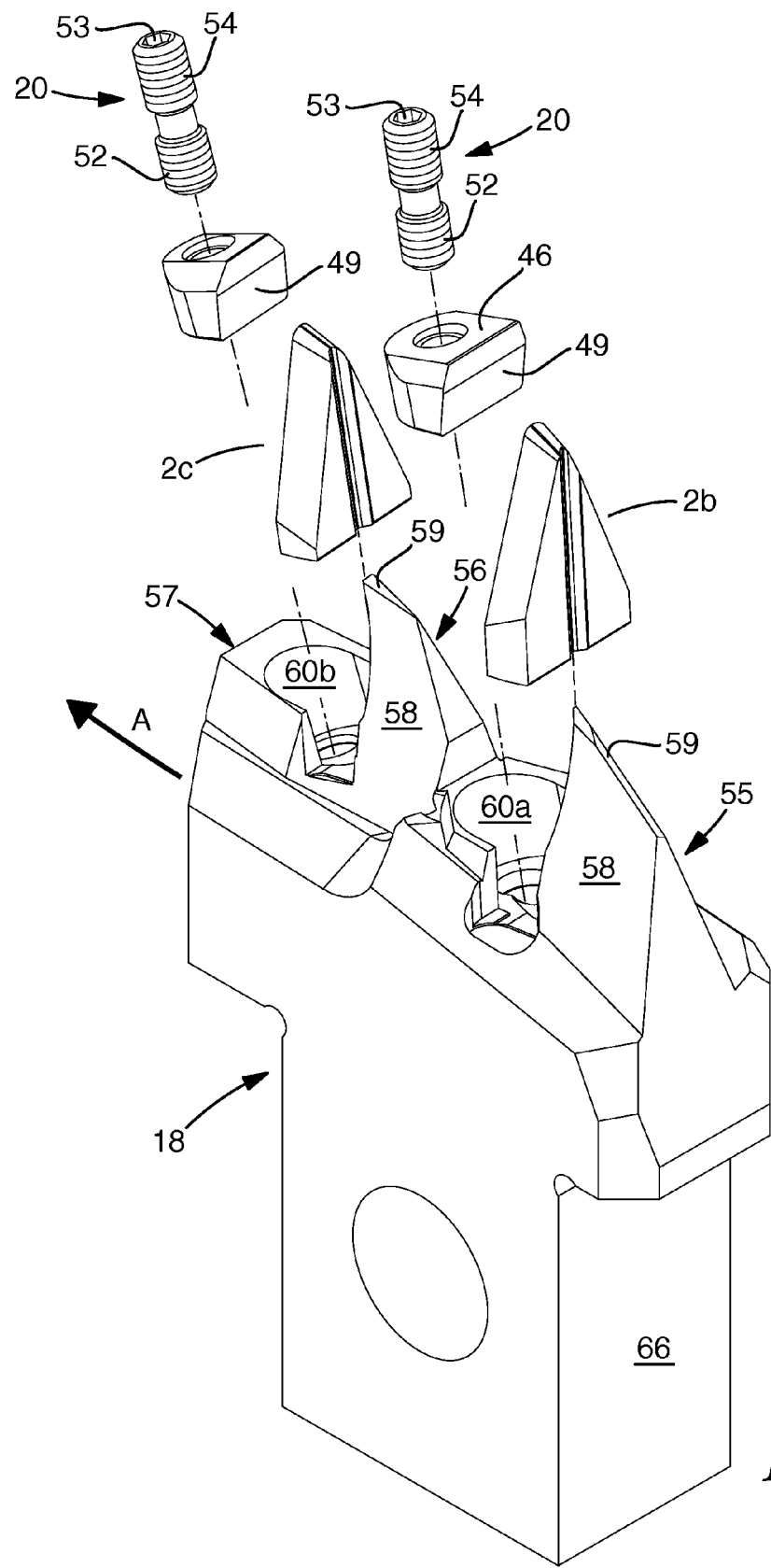
FIG. 8 is an analogous exploded view showing the chip removal unit from behind.

The chip removal units 3 shown in FIGS. 1-5 are illustrated more in detail in FIGS. 6-11. In FIGS. 6-8, there is seen that each individual unit (also denominated "cassette" or "module" by those skilled in the art) includes four categories of mutually interacting components—a holder 18, a wedge 19, a screw 20, as well as the milling insert generally designated 2. Of these components, the holder, the wedge, and the screw may be manufactured from steel, while the milling insert 2, which is a wear part, suitably is manufactured from a harder and more wear-resistant material, in particular for example, cemented carbide.

The holder 18 (see FIG. 7) includes an upper part 21 and a bottom part 22, the last-mentioned one of which has a parallelepipedic shape and is intended to be mounted in the above-mentioned pockets 10, 12. Through the bottom part 22, a through hole 23 extends for a bolt 24 (see FIGS. 1 and 2), which can be tightened in the threaded hole 11, 13 in the respective pocket 10, 12 to fix the individual holder 18 in the milling cutter head.

Although the individual chip removal unit 3 could be equipped with only one milling insert (as in U.S. Pat. No. 7,736,099), the embodiment exemplified in the drawings is preferred, wherein each unit 3 includes two milling inserts. Therefore, in the upper part 21 of the holder 18, two seats 25 are formed, each one of which includes an axial support 26 as well as a tangential support generally designated 27. In this case, the axial support 26 consists of two flat and laterally separated partial surfaces (see FIGS. 7 and 9), against which a flat end surface of the milling insert can bear. Also the tangential support 27 includes two partial surfaces 27a, 27b, but in addition a ridge 28.

Generally, the holders 18 of all chip removal units 3 are constructed in one and the same way. However, there are certain differences above all in respect to the spatial locations of the milling inserts between the five units that are mounted in the pockets 10 and the five that are mounted in the pockets 12. In FIG. 4, these two types of units are distinguished by means of the suffixes "a" and "b", respectively.

Before the holder 18 and the seats thereof are described further, reference is made to FIGS. 12-20, which illustrate an insert kit belonging to the tool and in which at least two different types of milling inserts are included, both having an asymmetrical basic shape. In the shown, preferred embodiment of the kit, there is also included a third type in the form of a symmetrical milling insert.

Figure 18:
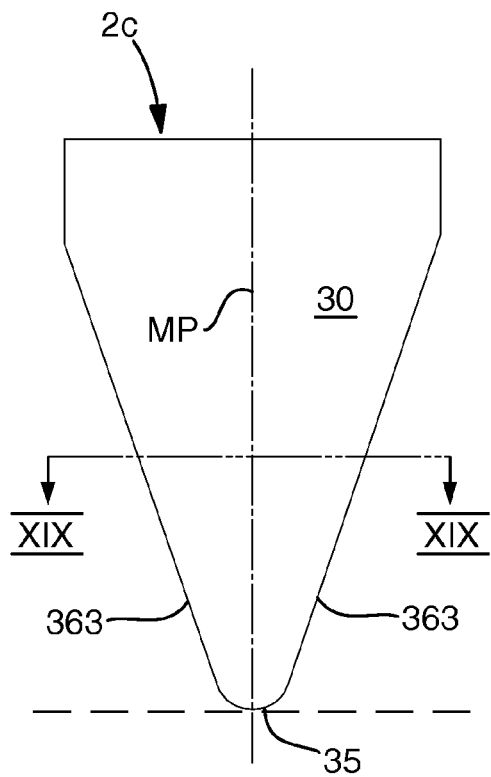
FIGS. 18-20 are analogous figures showing a third type of milling insert included in the insert kit.
Figure 20:
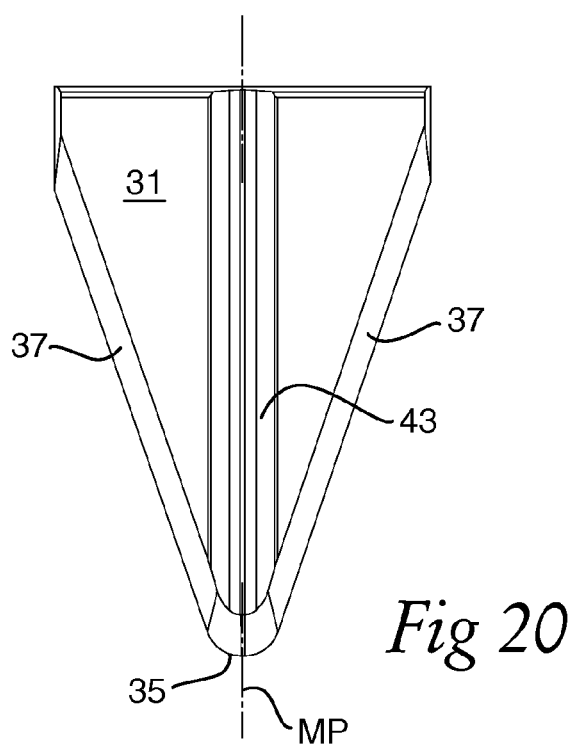
Figure 19:
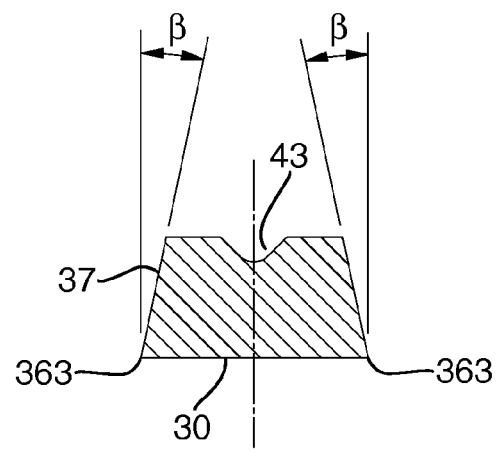

The two asymmetrical milling inserts are designated 2a and 2b, respectively, and are shown in FIGS. 12-14 and 15-17, respectively, while the symmetrical milling insert is designated 2c and is shown in FIGS. 18-20. Common to all these milling inserts 2a-2c is that they have a generally tapering or triangular contour shape in a front end and include an upper side 30, an under side 31, and a circumferential peripheral surface, which includes a plurality of partial surfaces described in more detail below. A front end or tip is designated 33, while a rear end in the form of a flat end surface is designated 34. A center plane designated MP extends between the front end 33 and the rear end surface 34. The last-mentioned one is intersected by the center plane MP at a point situated halfway between two points P1, P2, which define the lateral extension of the end surface 34. It is compulsory for all three milling inserts that the upper side 30 of the milling insert includes a chip surface adjacent to the front end 33. In the example, the upper side 30 is entirely flat and may, therefore, in its entirety be said to form a chip surface. Also the opposite under side 31 is flat (and parallel to the upper side 30).

In FIGS. 12 and 14 (as well as 15/17 and 18/20, respectively) the milling insert is assumed to stand on its end with the tip 33 facing downward, the observer viewing the upper side 30 in FIG. 12 and the underside 31 in FIG. 14 (the milling insert rotated 180°). The cross-sectional shape of the milling insert in a horizontal section along line XIII-XIII in FIG. 12 is shown in FIG. 13.

Each one of by the milling inserts embodies a cutting edge, in which there are included a front nose edge 35 and a flank edge designated as 361 in the milling insert 2a and designated as 362 in the milling insert 2b. Each flank edge is formed in the transition between the chip surface 30 and a first, flat clearance surface 37, which is a part of the circumferential surface. As for the nose edge 35, it is formed between the upper side 30 and a second, convexly arched clearance surface 38, which transforms into the first, flat clearance surface 37 via a first boundary line 39, and ends in a second boundary line 40 situated on the opposite side of the center plane MP. Because the clearance surface 37 is flat, the flank edge 361 becomes straight, while the nose edge 35 becomes arched as a consequence of the convex shape of the clearance surface 38.

The asymmetrical milling insert 2a shown in FIGS. 12-14 may be said to be left-hand cutting, so far that the chip removing flank edge 361 (and the connecting part of the nose edge 35) is situated to the left of the center plane MP, when the milling insert is regarded from the front (see FIG. 12). A clearance angle along the flank edge 361 is designated a and amounts in the example to 19°.

The edge 41 along the milling insert, which is laterally opposite the flank edge 361, forms a transition between the chip surface 30 and a flat side partial surface 42, which extends approximately right-angled to the chip surface (to optimize the strength of the milling insert). This edge 41 has no chip removing function.

The only difference between the milling insert 2a and the likewise asymmetrical milling insert 2b shown in FIGS. 15-17, is that the last-mentioned one is right-hand cutting. In this case, accordingly the chip removing flank edge 362 and the connecting clearance surface 37 are located to the right of the center plane MP, when the milling insert is regarded from the front (see FIG. 15). In this connection, it should be pointed out that the flank edges 361, 362 of the milling inserts 2a, 2b—in the exemplified embodiment—deviate uniformly in relation to the center plane MP.

The symmetrical milling insert 2c according to FIGS. 18-20 includes two uniform flank edges 363, which diverge in the backward direction from a common nose edge 35, the same deviating equiangularly in relation to the center plane MP (accordingly, this center plane may be said to form a bisector between the cutting edges). The clearance angles $\beta$ of the flank edges 363 are equally great although smaller than the previously mentioned clearance angle $\alpha$. In the example, accordingly $\beta$ amounts to approx. 12°.

Each type of milling insert 2a, 2b, 2c includes in its underside 31 a slot 43 of uniform narrowness that extends from the nose edge 35 to the end surface 34, and runs parallel to the center plane MP.

Reference is now made again to FIGS. 6-11, which illustrate the design of the chip removal units 3b (but not 3a) and the insert holders 18 thereof.

The individual wedge 19 (see FIGS. 7 and 8) includes an upper side 46, an underside 47 (see also FIG. 11), and two opposite wedge surfaces or contact surfaces 48, 49 that converge toward the underside 47. Of these, the first-mentioned one 48 is convexly arched and partially conical, and the last-mentioned one 49 flat. Through the wedge, a through hole 50 extends, which mouths in the upper side 46, as well as in the underside 47. In the very embodiment shown in FIGS. 6-11, the hole 50 includes a female thread 51 (see FIG. 11).

The individual screw 20 (see FIG. 8) includes, on one hand, a male thread 52 adjacent to a first, front end, and on the other hand, a key grip 53 in its opposite, rear end. For reasons that will be presented below, in this case the screw includes also a second, rear male thread 54.

Because the holder 18, in the preferred embodiment is equipped with two milling inserts, the same includes two protruding shoulders 55, 56 in which the aforementioned tangential support 27 is included. In addition to this, a third shoulder 57 is included, which also protrudes from the upper part of the holder, although the same is lower than the shoulders 55, 56. In FIG. 7, the arrow A indicates the direction in which the holder 18 moves during the rotation of the head of the milling cutter. When the milling inserts are subjected to cutting forces, these will be carried by the shoulders 55, 56, more precisely via the tangential supports 27. For this reason, these two shoulders are of robust construction so far that the thickness of the shoulder between the tangential support 27 and the back side of the shoulder is ample. Suitably, this thickness is approximately as great as the width of the milling insert along the end surface 34 (or greater). The profile shape of the shoulders connects to the triangular or tapering basic shape of the milling inserts. Thus, each shoulder is delimited by a pair of side surfaces 58 that converge toward a common crest 59. In addition, they converge in the backward direction for providing clearance in the area behind the flank edge of the mounted milling insert.

In the chip removal unit 3b shown in detail in FIGS. 6-11, a symmetrical milling insert 2c as well as an asymmetrical milling insert 2b, of the type shown in FIGS. 15-17, are included. Of these, insert 2c is running ahead in relation to insert 2b (see the arrow A in FIGS. 7 and 8).

In order to resist the forces that arise when the wedge 19 clamps the milling insert, at a distance in front of each tangential support 27, there is formed an abutting surface 60a and 60b, respectively, (see FIG. 8) that has a concavely arched shape corresponding to the convex shape of the wedge surface 48. The first-mentioned abutment surface 60a is formed in the back side of the middle shoulder 56, involving that the shoulder can be advantageously utilized not only to carry a tangential support on its front side but also the abutment surface 60a on its back side. In such a way, the chip removal unit can be manufactured in a compact design, wherein the distance between the two consecutive milling inserts is minimized without because of this the tangential support for the milling insert 2c running ahead becoming weak. The abutment surface 60b for the front wedge is included in the shoulder 57. Since this shoulder is not subjected to any cutting forces, but only to the pressure from the wedge, the same may be formed with a height that is considerably smaller than the height of the shoulders 55, 56. By its limited height, the shoulder 57 does not interfere with the cutting edges being behind of the milling inserts 2c, 2b. The nose edge 35, as well as the major part of the active flank edge 362, is accordingly situated above the upper side of the shoulder 57. In this connection, with reference to FIG. 6, it should be pointed out that the wedge 19 is narrower than the broadest part of the milling insert in order to, in addition, not interfere with the present flank edge.

Figure 11:
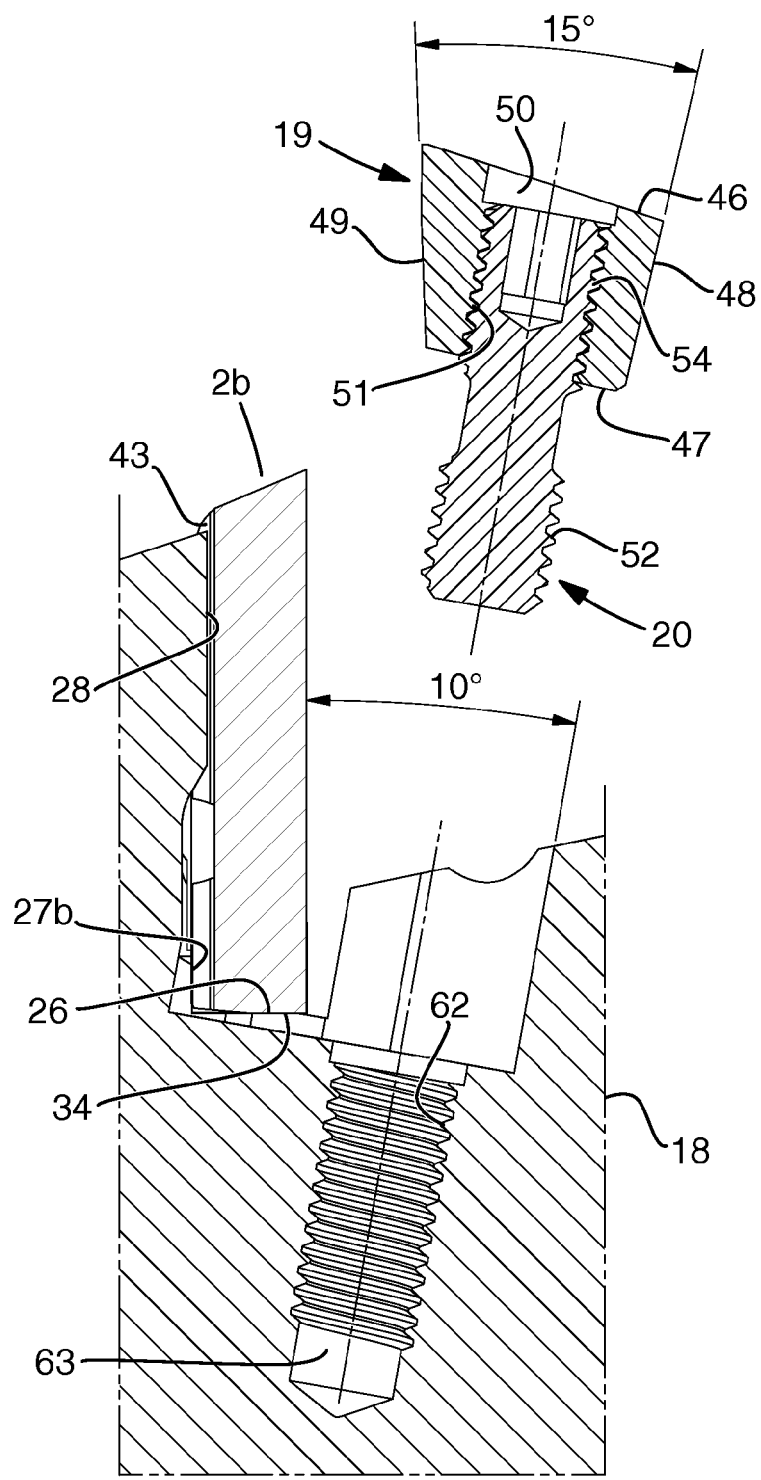
FIG. 11 is an enlarged, exploded detailed section showing a milling insert in co-operation with a wedge and a tightening screw for the same.

In FIG. 11, it is seen that a female thread 62 intended for the co-operation with the front male thread 52 of the screw is included in a drilled hole 63 in the holder. In FIG. 11, it is also seen how the rear end surface 34 of the mounted milling insert bears against the axial support (=the partial surfaces 26). Simultaneously, the ridge 28 included in the tangential support 27 engages with its flanks the flanks of the slot 43 in the underside 31 of the milling insert to guide the milling insert laterally. In other words, the mounted milling insert is supported by a three-point support in the form of the ridge 28 and the two laterally separated partial surfaces 27a, 27b (see FIG. 7).

As previously mentioned, the screw 20 includes two threads 52, 54, the first-mentioned one of which is intended to be tightened in the female thread 62 of the hole 63 (see FIG. 11). The other thread 54 is, however, tightened in the female thread 51 of the wedge 19. By forming the threads 52, 54 in various ways, e.g. by doing one of them left-threaded and the other right-threaded, or, alternatively, forming the threads with different pitch, an advantage is gained that the screw not only applies a tensile force to the wedge in connection with the milling insert being to be wedged up, but also a compressive force in connection with unscrewing is applied. In such a way, the release of the wedge is facilitated in connection with insert replacement. In this connection, it should be pointed out that the screw in connection with insert replacement does not need to be removed from the hole 63, but just to be rotated a few turns so that the wedge is spaced apart so far from the milling insert that the same can be picked away and be replaced by another.

Such an ejection function may also be provided in another way, e.g. by arranging a Seeger ring above the screw, by means of which the wedge is brought along when the screw is unscrewed.

Figure 9:
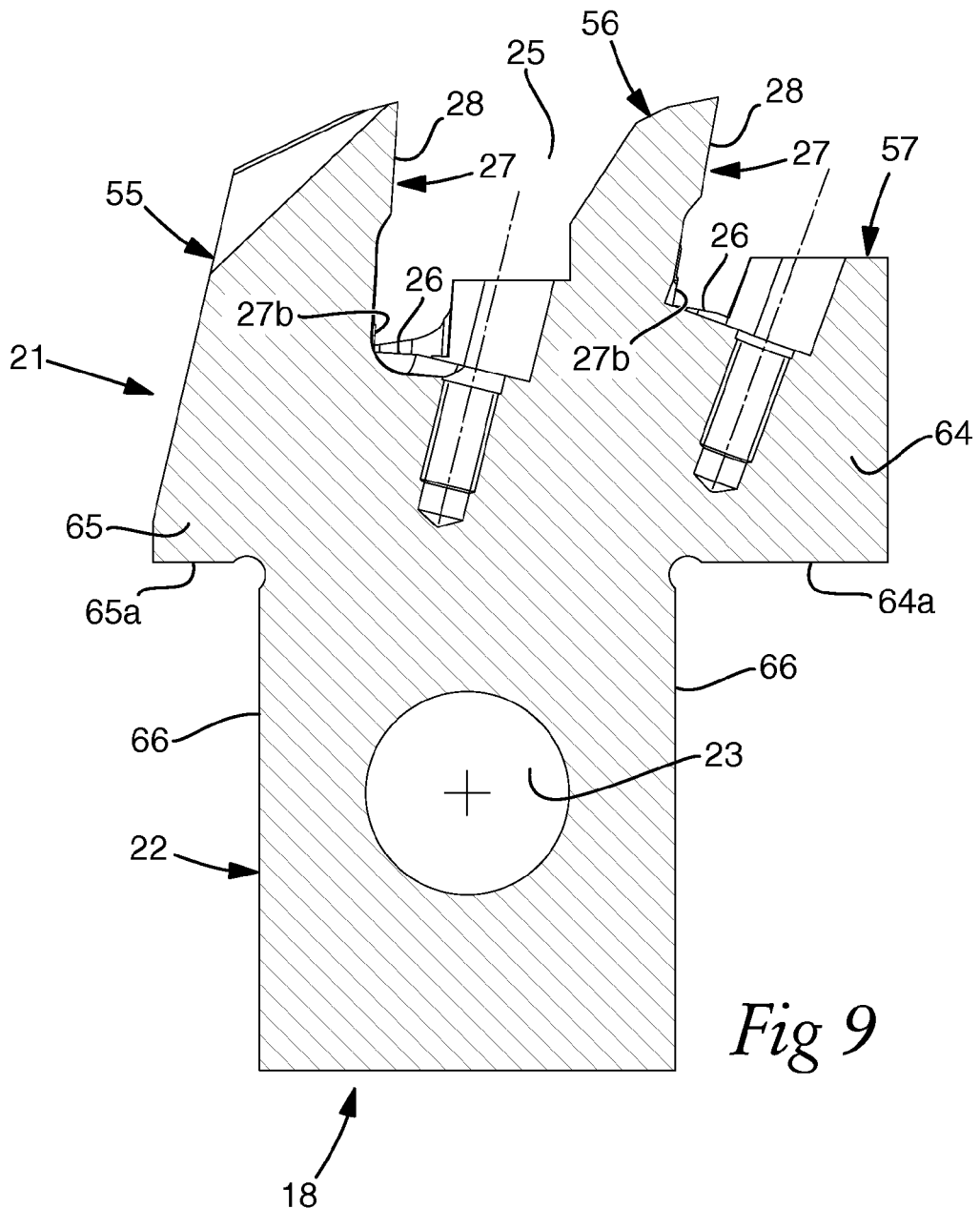
FIG. 9 is a central longitudinal cross-section through a holder included in the chip remover.

With a particular reference to FIG. 9 (see also FIG. 6), it should be pointed out that the upper part 21 of the holder is wider than the bottom part 22 thereof, more precisely by including two brackets 64, 65 corbelling out in relation to the last-mentioned one. The under sides 64a, 65a of these brackets are flat surfaces, which in the assembled state of the tool are pressed against the front side 4 of the head of the milling cutter. In practice, the surfaces 64a, 65a form a right angle with vertical limiting surfaces 66 of the bottom part 22. These limiting surfaces 66 are introducible with comparatively fine fit against the side limiting surfaces of the pockets 10, 12.

Figure 10:
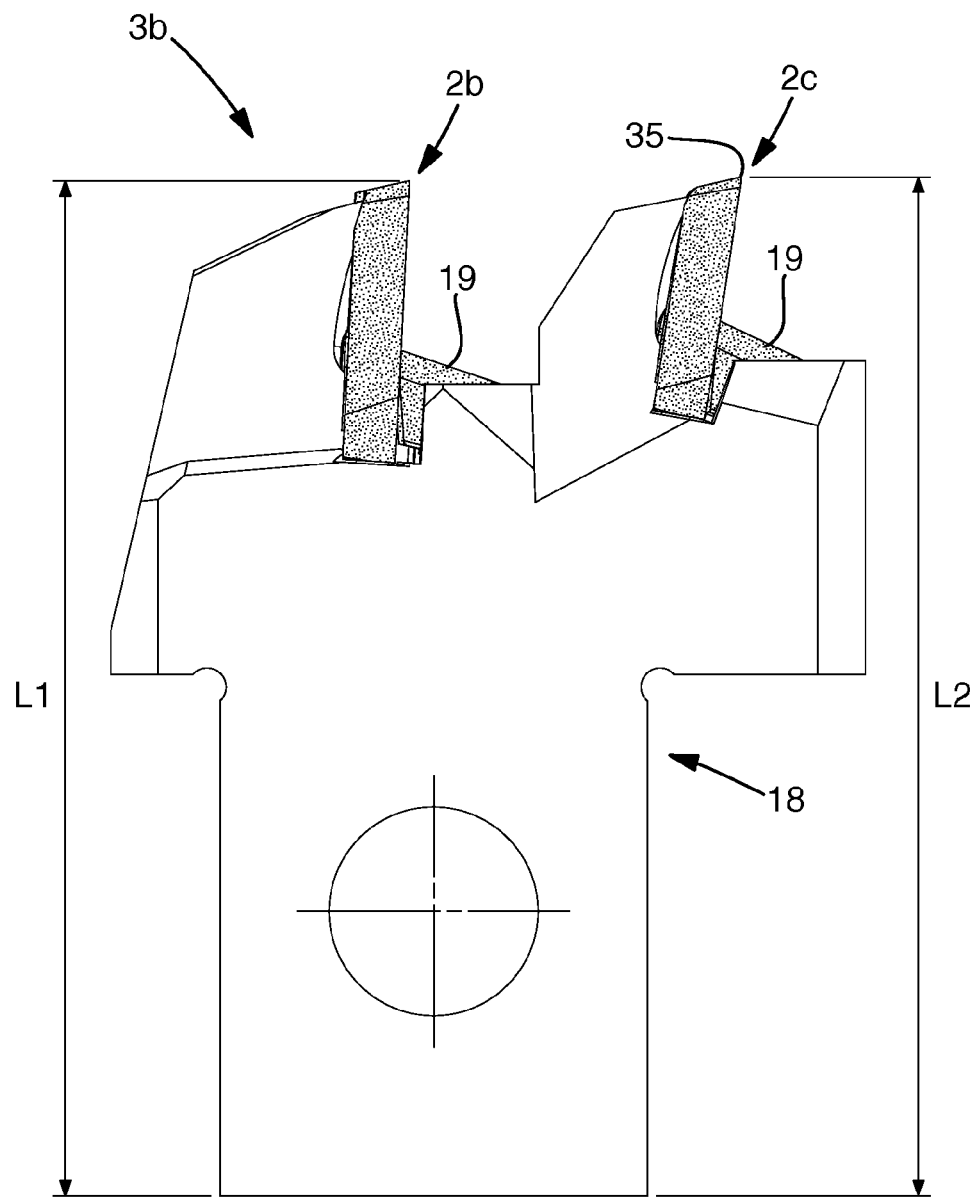
FIG. 10 is a dimensioned side view of a chip removal unit having mounted milling inserts and wedges.

In FIG. 10, it is shown how the nose edge 35 of the symmetrical milling insert 2c protrudes somewhat more than the nose edge of the asymmetrical milling insert 2b because the distance L1 is somewhat smaller than the distance L2. In practice, the difference between L1 and L2 may amount to mere tenths of a millimeter, e.g. 0.4 mm. Nevertheless, the nose edge 35 of the milling insert 2c will work at a greater depth in the workpiece than the nose edge of the milling insert 2b and thereby dig deeper into the workpiece than the nose edge of the milling insert 2b.

With reference to FIG. 4, it should be pointed out that the in total four milling inserts, which are included in two (rotationally) consecutive chip removal units 3a, 3b, are located at differently greater radial distances from the center axis C of the head of the milling cutter. Farthest from the center axis, there is the milling insert 2b included in the unit 3b, while the milling insert 2c running ahead of the same unit 3b is situated at a somewhat shorter radial distance from the center axis C. Of the two milling inserts 2a and 2c, which are included in the unit 3a, the first-mentioned one 2a is closer to the center axis than the last-mentioned one 2c. In addition, the milling insert 2c of the unit 3a is closer to the center axis than the milling insert 2c included in the unit 3b.

The above-mentioned radial differences of distance between the milling inserts 2a, 2c, 2c and 2b are so small (tenths of a millimeter) in relation to the diameter of the head of the milling cutter that arrow-heads cannot be used to illustrate the differences. However, the differences of position are seen in the detailed enlargement in FIG. 24.

Figure 21:
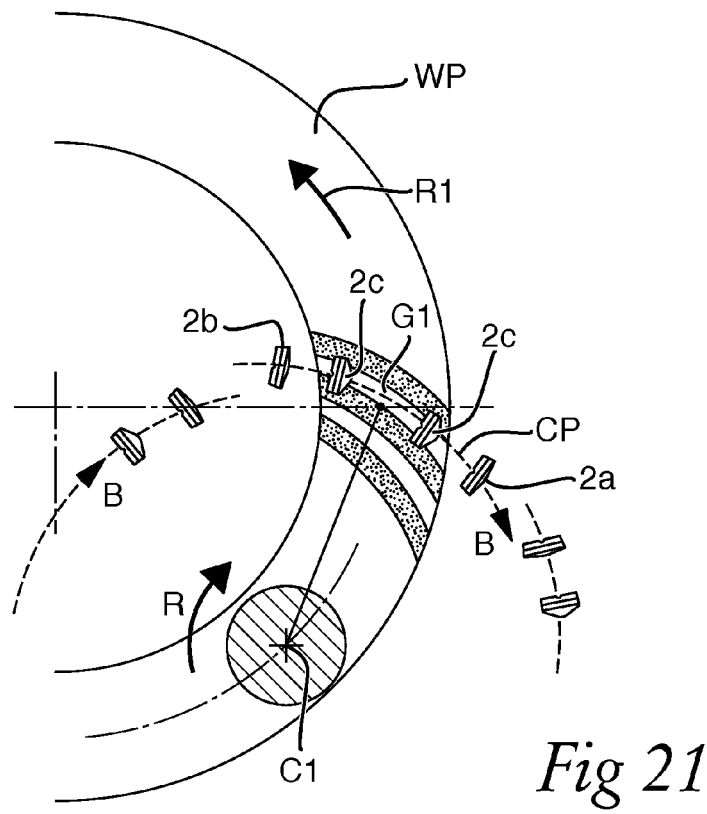
FIG. 21 is a schematic planar view showing a series of milling inserts during collective machining of an individual tooth slot.

Reference is now made to FIGS. 21-24, the two first-mentioned figures of which schematically illustrate the co-operation of the tool with a blank during gear hobbing of obliquely cut teeth in the same. In FIG. 21, the blank (e.g. a crown gear, a pinion, or the like to be made) is designated WP. The same rotates—as viewed from above—in the direction R1. Simultaneously, the milling inserts included in the rotary tool move in the direction of the arrows B.

Figure 23:
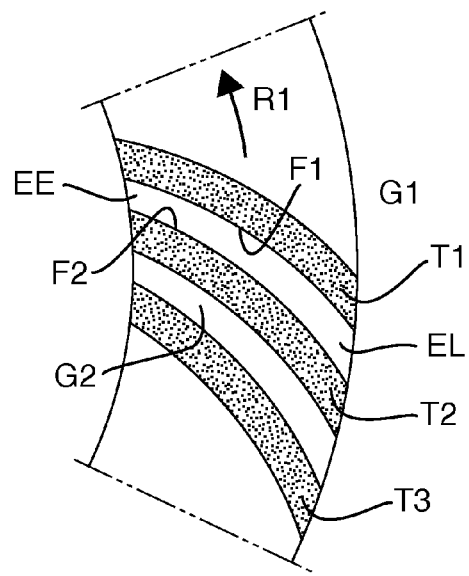
FIG. 23 is an enlarged detailed view showing a number of teeth as well as a number of tooth slots therebetween.

In the enlarged, schematic detailed view of FIG. 23, T1, T2 and T3 designate three consecutive teeth in the gear rim to be made, while G1 and G2 designate tooth slots or gashes between the same. One end of the tooth slots is designated EE and the opposite end EL. The individual milling insert enters the slot at the end EE and exits the same at the end EL. Opposite tooth flanks or flank surfaces along the individual tooth slot are designated F1 and F2, respectively.

Figure 22:
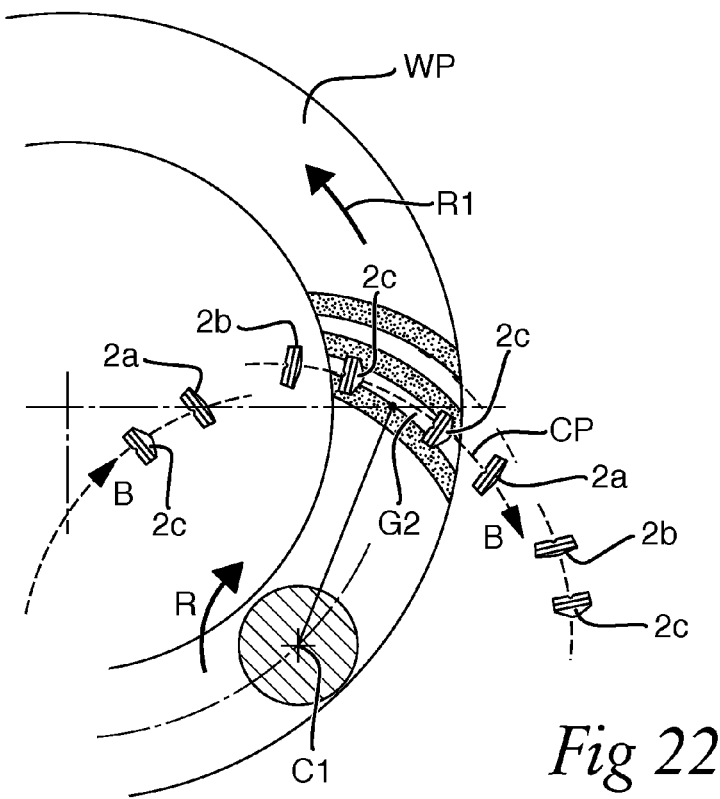
FIG. 22 is an analogous planar view showing how another series of milling inserts machine a tooth slot following behind
Figure 24:
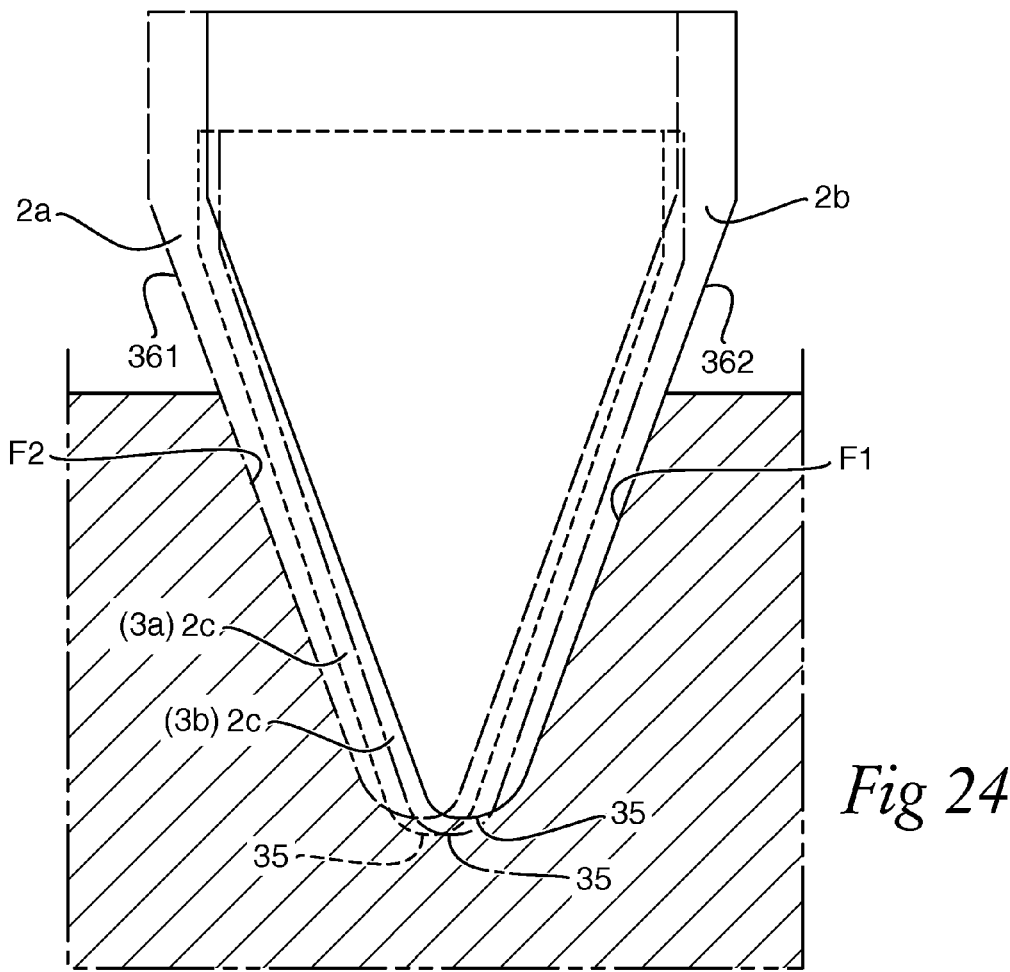
FIG. 24 is a schematic front view that, on an enlarged scale, illustrates four consecutive milling inserts during collective machining of a tooth slot.

In FIGS. 21 and 22, a number of milling inserts are shown without the appurtenant milling cutter head. In practice, the front side of the head of the milling cutter is facing downward toward the workpiece WP so as to, by means of the downwardly protruding milling inserts thereof, mill out the slots G1, G2 in the upper side of the workpiece (which may have a conical shape). The workpiece WP, as well as the tool rotates continuously while all tooth slots have been milled out to a certain feed depth (e.g. 0.1-0.3 mm). The tool rotates at a considerably greater number of revolutions than the workpiece, the individual milling insert moving in a cyclo-palloid curved path CP (the path that an individual point in a rolling circle describes, when it rolls against the base circle in a cyclo-palloid). When the speeds of rotation are correctly synchronized, a set including four milling inserts, i.e., $2a$, $2c$, $2c$ and $2b$, will traverse one and the same tooth slot G1 (see FIG. 21). When the workpiece has rotated a further distance, a set of milling inserts following behind (see FIG. 22) will mill out a tooth slot G2 following behind. As seen in FIG. 24, the radially outermost milling insert $2b$ will form the flank surface F1 of the tooth slot, more precisely by its flank edge 362. In an analogous way, the milling insert $2a$ will by its flank edge 361 form the opposite flank surface F2 of the tooth slot. The intervening, symmetrical milling inserts $2c$ of the chip removal units $3a$, $3b$ have the flank edges 363 thereof situated inside the flank edges 361 and 362, respectively, of the milling inserts $2a$, $2b$, and therefore the same do not contribute in the forming of the flank surfaces F1 and F2. However, the nose edges 35 of the two milling inserts $2c$, $2c$ will mill out a bottom that is situated on a level below the nose edges of the milling inserts $2a$, $2b$. In this way, the advantageous effect is obtained that a clearance is created between the nose edges of the asymmetrical milling inserts and the slot bottom created by the nose edges of the symmetrical milling inserts. In practice, this means that the nose edges 35 of the asymmetrical milling inserts $2a$, $2b$ only partly participate in the forming of the bottom of the tooth slot. For this reason, the asymmetrical milling inserts become comparatively easy-cutting.

By a comparison between FIG. 21 and FIG. 22, it is seen that the synchronized rotary motions are adapted in such a way in relation to each other that a new set including four milling inserts $2a$, $2c$, $2c$, $2b$ will machine the tooth slot G2 following behind when the tooth slot G1 being in front has been machined.

One of several advantages of the present disclosure is that the individual milling insert individually can be mounted and dismounted by means of a wedge and a simple screw, the key grip of which is easy to access. Another advantage, also vital from a tool-constructive point of view, is based on the fact that the milling insert and the wedge are located between two tangentially spaced-apart shoulders. This location of the wedge clamping means that the milling insert in a reliable way can be fixed in a position in which the tangentially acting cutting forces press the milling insert against a tangential support being behind, which in a safe way carries the same and thereby efficiently counteract any risk of the milling insert being dislodged from its position. In this connection, it should be emphasized that the wedge clamping being unique to the invention ensures a stable and immovable fixation of the milling insert in comparison with a simple screw clamping of the milling insert. A particular advantage affords the embodiment in which the holder of the chip removal unit includes two corbelling brackets, the under sides of which are pressed against the front side of the head of the milling cutter. In this embodiment, it is guaranteed that the bottom part of the holder cannot tilt out of its predetermined position in relation to the reference plane of the head of the milling cutter. In the preferred embodiment in which each chip removal unit includes two milling inserts in one and the same holder, the advantage is gained that the tolerance chain between two milling inserts operating after each other are not lost if only one of the milling inserts would be demolished, because the respective positions of the milling inserts remain intact in the upper part of the holder. In other words, damage to one of the two milling inserts requires only the simple measure of replacing the damaged milling insert. If, peradventure, both milling inserts of one and the same holder would be damaged simultaneously with any one of the seats in the holder, the chip removal unit in its entirety can be replaced quickly and easily with an intact unit having two undamaged milling inserts.

Within the scope of the invention, as exemplified in the above-mentioned description and the appended drawings, numerous modifications may be carried out by a person skilled in the art. Thus, the milling cutter head, i.e., the basic body of the tool, may be manufactured in a single piece instead of two parts detachably connected to each other. Also, the spatial location of the milling inserts in the milling cutter head may deviate from the one exemplified. Among other things, between two asymmetrical, tooth flank-forming milling inserts, it is feasible to arrange only one symmetrical milling insert having the primary task of providing a deepened bottom in the tooth slot. As guide means in the interface between the back side of the milling insert and the tangential support, other male/female members than exactly a single ridge in co-operation with a single slot may also be used. Thus, serration connecting surfaces of the type that includes a plurality of ridges and grooves may also be used.

Although the present embodiment(s) has been described in relation to particular aspects thereof, many other variations and modifications and other uses will become apparent to those skilled in the art. It is preferred therefore, that the present embodiment(s) be limited not by the specific disclosure herein, but only by the appended claims.

The invention claimed is:

1. A gear hobbing tool comprising:
a head having a front side, a back side, and a center axis on which the head is rotatable; and
a plurality of chip removal units detachably mounted along the front side of the head, each chip removal unit including an insert holder having an upper part and a bottom part anchored in the head, and a replaceable milling insert fixed in a seat located in the upper part of the insert holder and delimited by an axial support and a tangential support by a screw having a male thread and a key grip at one end, wherein the seat of each insert holder is placed between at least two shoulders included in the upper part and protruding in the direction from the front side of the head, a first shoulder of which includes the tangential support, and each milling insert is arranged between the tangential support and a wedge having a through hole that extends between an upper side and an under side of the same and accommodates the screw, the male thread thereof being tightened in a threaded hole in the insert holder, and with the key grip facing upward in relation to the wedge, the wedge including two opposite contact surfaces, which converge toward the underside of the wedge, one of which facing the milling insert and the other facing the second shoulder.

2. The gear hobbing tool according to claim 1, wherein the upper part of the insert holder includes three separated shoulders and two seats arranged between the same, each seat receiving a milling insert that is kept pressed against an appurtenant tangential support by the wedge provided with the screw.

3. The gear hobbing tool according to claim 1, wherein the upper part of the insert holder is wider than the bottom part thereof by including two brackets corbelling out in relation to the bottom part and having undersides that rest against the front side of the head.

4. The gear hobbing tool according claim 1, wherein the head includes two parts detachably connected to each other by a hub part having a plurality of tangentially spaced-apart and radially protruding extension arms, which individually include a radially outwardly open pocket in which the bottom part of the holder is placed, and a rim part having housings, which are tangentially spaced-apart via gaps in which the extension arms of the hub part are situated, and which individually include a radially outwardly open pocket in which the bottom part of the holder is placed.

5. The gear hobbing tool according to claim 4, wherein, in an inner wall in the individual pocket here mouths a threaded hole in which a bolt is tightened, which extends through a through, radially oriented hole in the bottom part of the holder.

6. The gear hobbing tool according to claim 1, further comprising an insert kit having two different types of milling inserts, each of the milling inserts including an upper side having a chip surface, an under side, and a clearance surface, which, together with the chip surface, forms a cutting edge that includes a front nose edge and a flank edge running backward from the same and deviating from a center plane through the milling insert, the two types of milling inserts having an asymmetrical shape such that the flank edge and the nose edge of one of the types of milling inserts are located to the left of said center plane, while the flank edge and the nose edge of the other type of milling insert are placed to the right of the center plane of the milling insert.

7. The gear hobbing tool according to claim 6, wherein the insert kit includes a third type of milling insert having a symmetrical shape and including two flank edges running backward from a nose edge, and deviating equiangularly from the center plane of the milling insert, and each having equally increasing clearance angles, the symmetrical milling inserts in the mounted state having the nose edges thereof situated at a greater axial distance from the front side of the head of the milling cutter than the nose edges of the asymmetrical milling inserts.

8. The gear hobbing tool according to claim 6, wherein the milling inserts of the first type and the milling inserts of the second type are included in two different, tangentially spaced-apart, although adjacent chip removal units.

9. The gear hobbing tool according to claim 8, wherein each individual chip removal unit includes a milling insert having an asymmetrical shape and a milling insert having a symmetrical shape.

10. The gear hobbing tool according to claim 9, wherein in half the number of chip removal units, the asymmetrical milling inserts are running ahead and the symmetrical milling inserts are following behind with respect to the direction of rotation of the head, while the other chip removal units have the symmetrical milling inserts thereof placed in front of the asymmetrical milling inserts.

11. The gear hobbing tool according to claim 9, wherein at least the asymmetrical milling inserts of each set include four consecutive milling inserts located at other radial distances from the center axis of the head of the milling cutter than the symmetrical milling inserts.

12. An insert holder for gear hobbing tools, comprising:
an upper part;
a bottom part, the upper part having a seat for the receipt of milling inserts and delimited by an axial support and a tangential support, wherein the seat is placed between two shoulders included in the upper part, a first shoulder including the tangential support; and
a wedge having a through hole that extends between an upper side and an underside of the same and accommodates a screw having a male thread that is tightenable in a threaded hole in the holder, and having a key grip that is directed upward from the upper side of the wedge, the wedge including two opposite contact surfaces, which converge toward the underside of the wedge, one of the contact surfaces facing the tangential support surface and the other contact surface facing the second shoulder.

13. The insert holder according to claim 12, wherein the upper part includes three separated shoulders and two seats, which individually house a milling insert and a wedge provided with a screw.

14. The insert holder according to claim 12, wherein the upper part is wider than the bottom part thereof by including two brackets corbelling out in relation to the bottom part.

15. The insert holder according to claim 14, wherein the bottom part has a through hole.

16. A chip removal unit for gear hobbing tools, comprising:
an insert holder including an upper part and a bottom part, the upper part having a seat for the receipt of milling inserts and delimited by an axial support and a tangential support, wherein the seat is placed between two shoulders included in the upper part, a first shoulder including the tangential support, and a wedge having a through hole that extends between an upper side and an underside of the same and accommodates a screw having a male thread that is tightenable in a threaded hole in the holder, and having a key grip that is directed upward from the upper side of the wedge, the wedge including two opposite contact surfaces, which converge toward the underside of the wedge, one of the contact surfaces facing the tangential support surface and the other contact surface facing the second shoulder; and
a detachable milling insert wherein the milling insert is clamped between the tangential support and wedge of the insert holder.

17. An insert kit for a gear hobbing tool the gear hobbing tool having a head having a front side, a back side, and a center axis on which the head is rotatable and a plurality of chip removal units detachably mounted along the front side of the head, each chip removal unit including an insert holder having an upper part and a bottom part anchored in the head, the insert kit comprising:

a plurality of milling inserts, each individual milling insert being fixed in a seat located in the upper part of the insert holder by a screw and delimited by an axial support and a tangential support, the screw having a male thread and a key grip at one end, wherein the seat of each individual insert holder is placed between two shoulders included in the upper part and protruding in the direction from the front side of the head of the gear hobbing tool, a first shoulder including the tangential support, each individual milling insert being arranged between the tangential support and a wedge having a through hole that extends between an upper side and an underside of the same and accommodates the screw, the male thread thereof being tightened in a threaded hole in the insert holder, and the key grip facing upward in relation to the wedge, the wedge including two opposite contact surfaces, which converge toward the underside of the wedge, and one of which is facing the milling insert and the other facing the second shoulder, each individual milling insert including a center plane, an upper side having a chip surface, an underside, and a clearance surface, which, together with the chip surface, forms a cutting edge that includes two part edges, a front nose edge and a flank edge running backward from the same and deviating from the center plane wherein two types of milling inserts have an asymmetrical shape such that a clearance partial surface adjacent to the flank edge of the individual milling insert has a greater clearance angle than an opposite side surface, the flank edge of a first type of milling insert being placed to the left of the center plane, while the flank edge of the second type of milling insert being placed to the right of the center plane.

18. The insert kit according to claim 17, wherein a third type of milling insert has a symmetrical shape such that two flank edges deviate equiangularly from the center plane, and clearance surfaces along the two flank edges have one and the same clearance angle.

* * * * *